W. C. DAVIS.
Covers for Baking Pans.
No. 40,461. Patented Nov. 3, 1863.
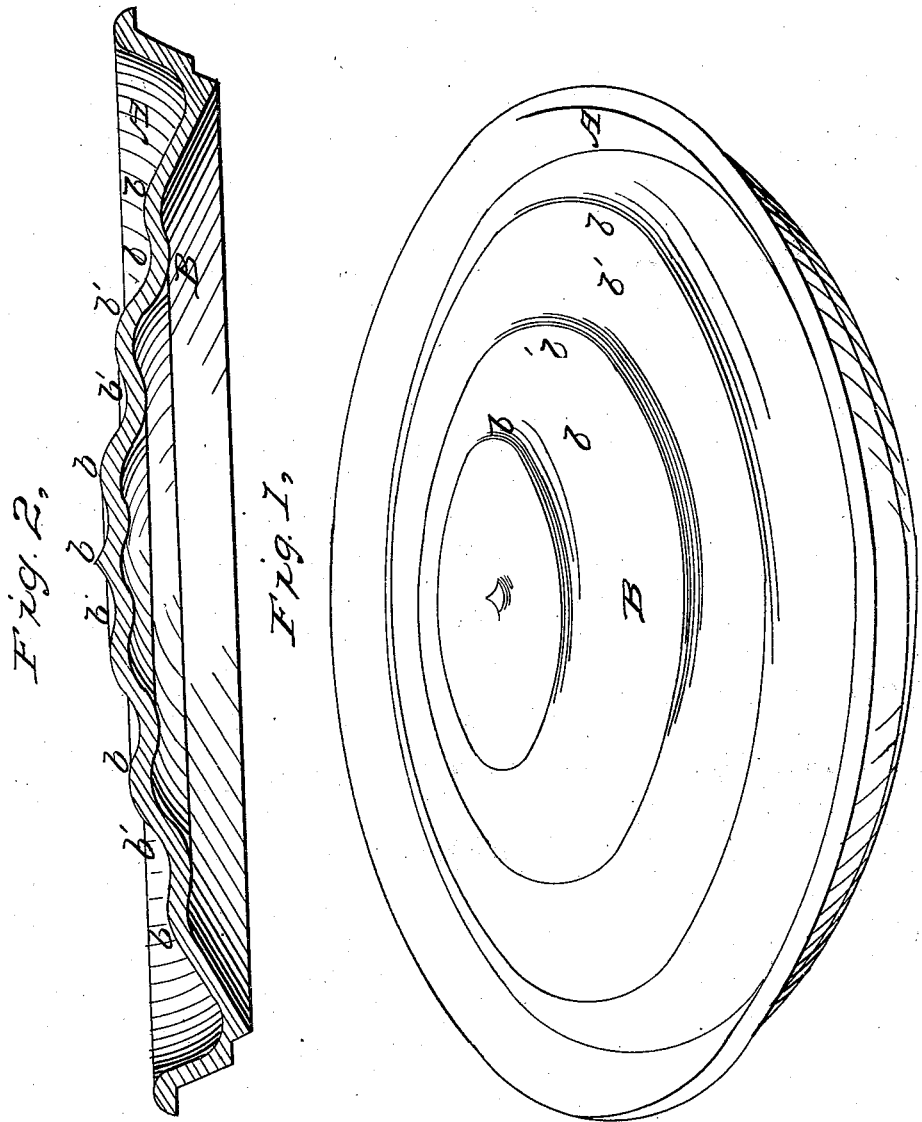

UNITED STATES PATENT OFFICE.

W. C. DAVIS, OF CINCINNATI, OHIO.

IMPROVEMENT IN COVERS FOR BAKING-PANS.

Specification forming part of Letters Patent No. 40,461, dated November 3, 1863.

*To all whom it may concern:*

Be it known that I, WILLIAM C. DAVIS, of Cincinnati, Hamilton county, Ohio, have invented a new and useful Cover for Baking-Skillets or Dutch-Ovens; and I do hereby declare the following to be a full, clear, and exact description thereof, reference being had to the accompanying drawings, making part of this specification.

My invention has reference to the cover of the familiar baking-skillet or Dutch-oven, to be found in every farm-house, the objects being to combine greater efficiency and durability without adding to the cost.

The ordinary form of Dutch-oven covers is that of a simple pan having a confining rim or "kerb," and a level or slightly crowning bottom called the "crown." Oven-covers of the customary form, in the violent alternations of heat and cold incident to their use, are very liable to crack, partly because of their rigidity and partly because their entire surface is brought in contact with the embers, which has also the objectionable effect of deadening the fire by too sudden abstraction of its heat and insulation of its lower portions from atmospheric contact.

Figure 1 is a perspective view of my improved oven cover. Fig. 2 is an axial section.

A is the customary rim or kerb.

The part B, which constitutes the crown or hearth, is made somewhat crowning and with a series of concentric ridges, $b$, and furrows $b'$. The ridges $b$ act to hold the embers somewhat aloof from the crown, and by diminishing the points of contact prevent a too sudden deadening of the fire, while the furrows $b'$ act to admit air beneath the embers, so as to sustain their combustion. A cover made on this principle is not endangered by sudden or unequal expansion or contraction, its corrugated crowning form enabling it, without strain, to assume a greater or less convexity in obedience to the resultant forces.

A highly-prized effect of my improvement is found in the fact of the corrugations retaining the embers in place on the crown and preventing their rolling off when the cover is temporarily lifted to examine the biscuits.

Another obvious advantage is the increased heating-surface due to the corrugations.

I claim as a new and improved article of manufacture—

The corrugated Dutch-oven cover A B $b$ $b'$, substantially as set forth.

In testimony of which invention I hereunto set my hand.

W. C. DAVIS.

Witnesses:
 GEO. H. KNIGHT,
 CHARLES L. FISHER.